United States Patent Office 3,198,043
Patented Aug. 3, 1965

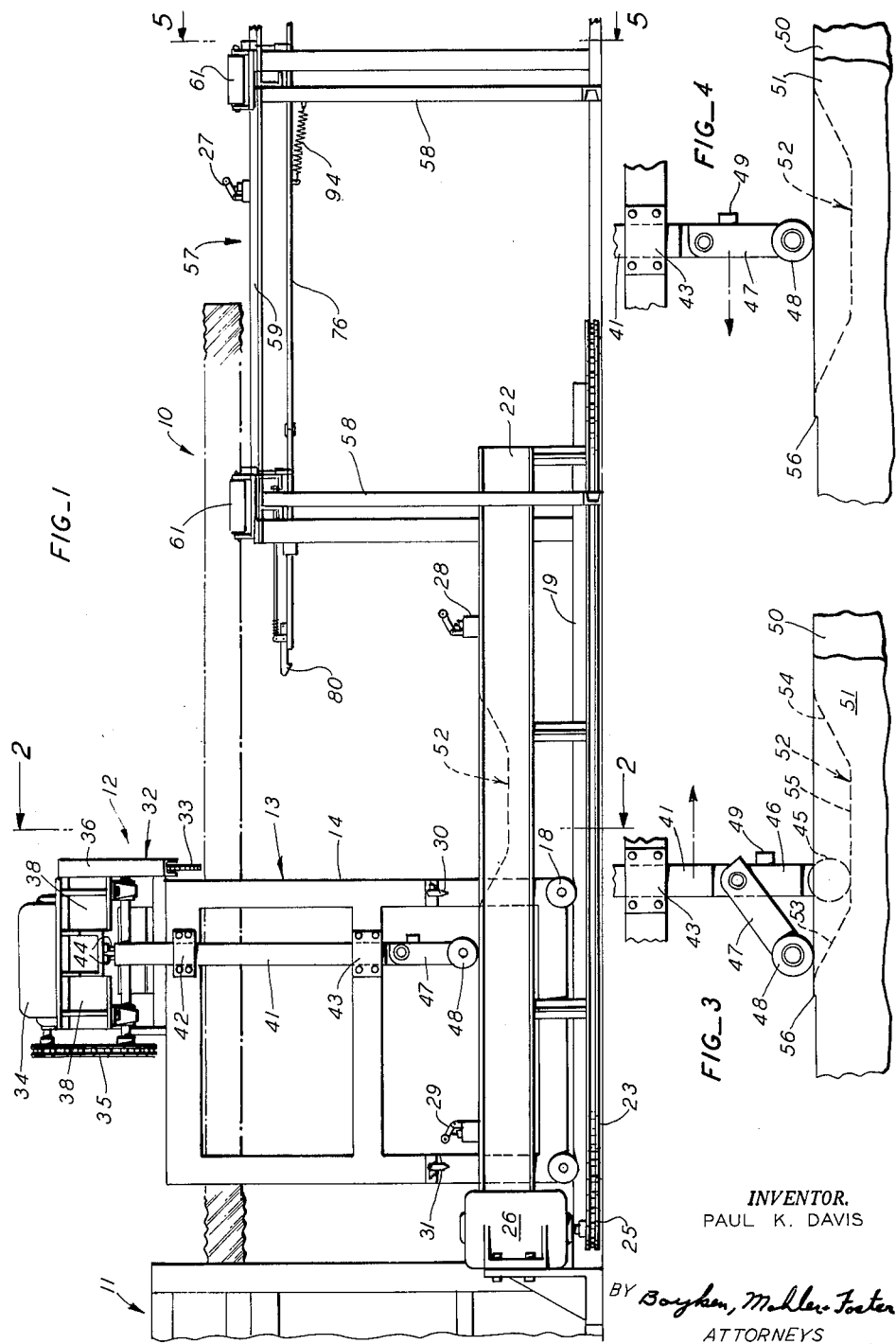

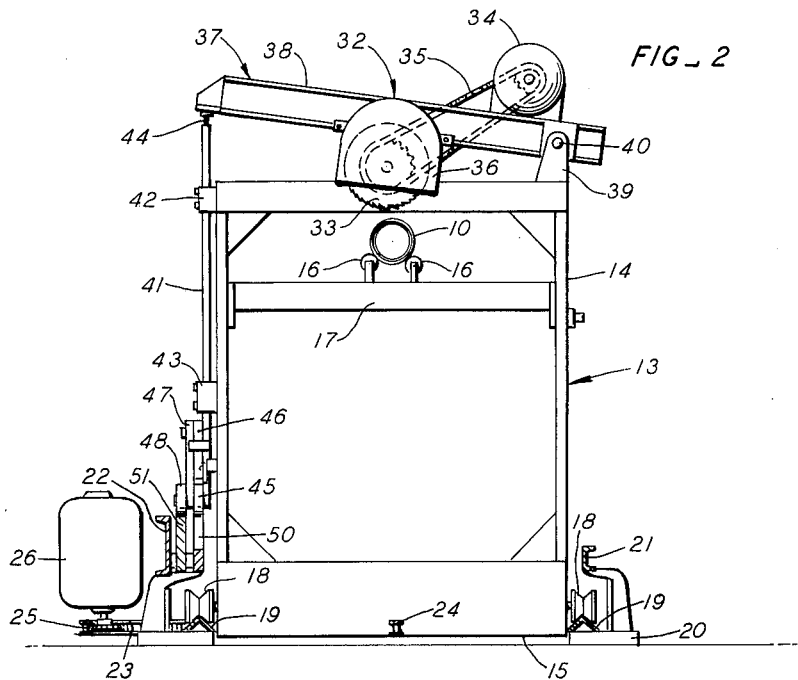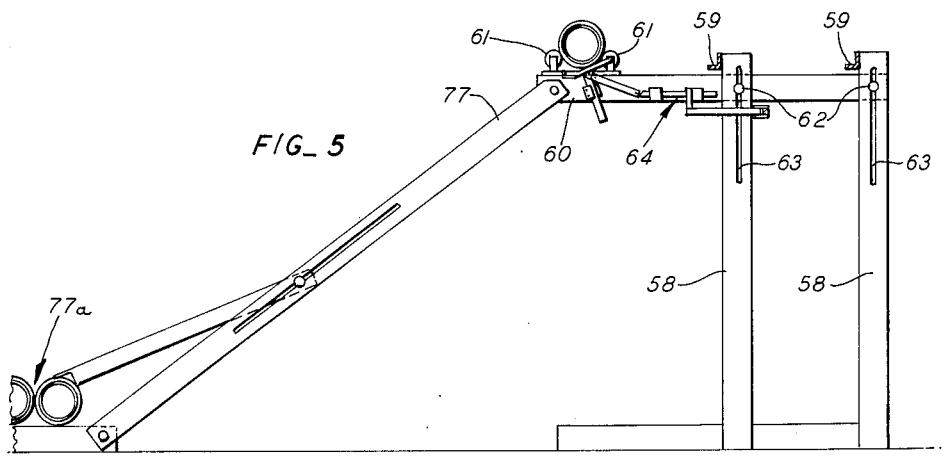

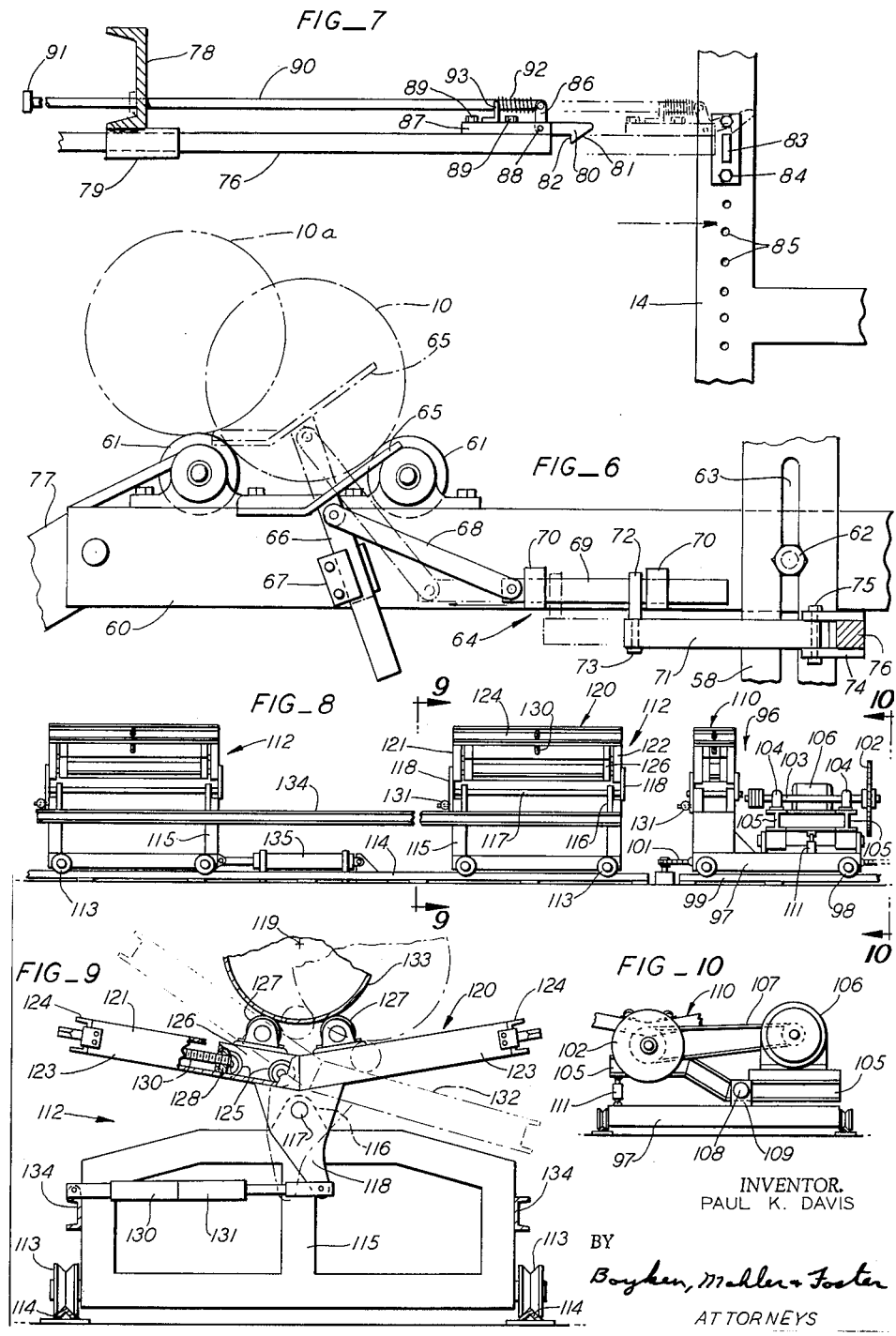

3,198,043
PIPE CUTTING AND HANDLING APPARATUS
Paul K. Davis, Alameda, Calif., assignor to Pacific Roller Die Co., Inc., Hayward, Calif., a corporation of California
Filed Jan. 3, 1963, Ser. No. 249,196
12 Claims. (Cl. 82—53.1)

This invention relates to a method of and apparatus for cutting and handling pipe, and more specifically to apparatus and method for cutting continuously formed sheet metal pipe into desired lengths and automatically unloading the cut pipe lengths onto an adjacent stock pile.

The cutting and handling method and apparatus of the present invention is adapted to be employed in connection with the type of pipe forming machine wherein a flat strip of sheet metal is formed into helical convolutions and the adjacent edges of the convolutions are joined into a seam to thereby form a continuous sheet metal pipe. The pipe thus formed is discharged from the forming machine along a path of travel extending longitudinally of the pipe. The forming operation is such that the discharging pipe is also rotating about its longitudinal axis.

In order to stock, ship, and utilize such pipe, for such installations as culverts and the like, it is necessary to cut the continuously formed pipe into suitable lengths for convenient handling. The cutting and handling apparatus of this invention therefore utilizes the movement of the discharging, continuous pipe to effect cutting such pipe into lengths and displacing such lengths from the path of travel of the pipe issuing from the forming machine.

It is therefore an object of this invention to provide apparatus and method for cutting elongated sheet metal pipe, which apparatus is coordinated with the movement of the pipe along a path during the cutting operation.

Another object of this invention is the provision of cutting apparatus to be used in connection with the formation of a continuous pipe for cutting such pipe into successive lengths, which apparatus can be readily adjusted to cut different pipe lengths and is fully automatic in operation.

It is another object of the present invention to provide apparatus and method adapted for coordinated operation with a forming machine which is continuously forming sheet metal pipe, which apparatus receives and supports the pipe, cuts it into desired successive lengths, and ejects such lengths from the path of the continuous pipe onto an adjacent stock pile without requiring any manual handling of the pipe lengths and by which method interference between such pipe lengths is prevented.

A further object of the present invention is to provide apparatus for cutting continuously formed sheet metal pipe, which is rotating as it is delivered from the pipe-forming mechanism, wherein the rotation of the pipe is utilized to effect cutting of the pipe into desired lengths.

Yet another object of the invention is to provide apparatus for cutting continuously formed sheet metal pipe as the pipe emerges from the pipe-forming mechanism, whereby the pipe cutting apparatus is independently moved along the path of the longitudinal movement of the pipe at the same speed thereas in order to achieve a complete and clean cut-off of the pipe.

It is still another object of the present invention to provide apparatus for automatically cutting and ejecting continuously formed sheet metal pipe, wherein the apparatus may be adjusted to accommodate pipe of various diameters.

These and other objects and advantages of the present invention will become apparent from the following description, taken in conjunction with the accompanying drawings, in which:

FIG. 1 is a side elevational view of the cutting and handling apparatus of this invention positioned at the discharge end of the pipe forming mechanism;

FIG. 2 is an end elevational view of the cutting portion of the apparatus as seen from line 2—2 of FIG. 1;

FIG. 3 is an enlarged front elevational view of the cam mechanism portion of the apparatus of FIG. 1, showing the operation thereof during movement of the carriage of such apparatus in one direction;

FIG. 4 is a view similar to FIG. 3 showing the operation of the cam mechanism during movement of the carriage in the opposite direction;

FIG. 5 is an end elevational view of the handling portion of the apparatus as seen from line 5—5 of FIG. 1;

FIG. 6 is an enlarged end elevational view of a portion of the apparatus of FIG. 5;

FIG. 7 is an enlarged side elevational view of the opposite side of a portion of the apparatus of FIG. 1 showing the ejecting apparatus actuation means of this invention;

FIG. 8 is a side elevational view of a modified form of the cutting and handling apparatus of this invention;

FIG. 9 is an end elevational view of the handling apparatus as seen from line 9—9 of FIG. 8;

FIG. 10 is an end elevational view of the cut-off mechanism as seen from line 10—10 of FIG. 8.

Generally, the present invention provides apparatus and method which is adapted to cooperate with a pipe forming machine of the type which discharges a continuous sheet metal pipe along a generally horizontal path of travel that extends longitudinally of the pipe axis. At the same time such pipe is rotating about its axis.

The apparatus herein described includes a cutting apparatus so related to the forming machine as to cut such continuous pipe into successive lengths of predetermined extent. The rotation of the pipe is preferably employed to facilitate such cutting.

Each length, as cut, is displaced from said path by a subsequent, handling apparatus which is preferably actuated in response to operation of the cutting apparatus. Further, the handling apparatus facilitates stacking the pipe lengths in layers to form a bundle for storing or shipping.

In detail, referring to the drawings, and more particularly to FIGS. 1 and 2 thereof, there is shown a continuously formed sheet metal pipe 10 emerging from the pipe forming machine indicated generally at 11. The pipe 10 generally horizontally moves at a predetermined rate in one direction along a path extending longitudinally of the pipe, and rotates about its longitudinal axis as it emerges from the forming machine.

Adjacent the discharge end of the pipe forming machine 11, there is shown the cutting apparatus of the present invention indicated generally at 12. An upright carriage 13, comprising an upper frame portion 14 and a lower base portion 15 (FIG. 2) is adapted to rotatably support the pipe 10 for cutting by means of a pair of spaced rollers 16 mounted on a laterally extending adjustable cross piece 17 in the frame 14. The rollers 16 are free to rotate responsive to the rotation of the pipe 10. The surfaces of the rollers 16 are smooth to allow the pipe 10 to slide in virtually unrestricted longitudinal movement.

The base 15 of the carriage 13 has mounted thereon two pairs of freely rotatable wheels 18 which are adapted to roll on a pair of generally triangular shaped rails 19. The rails 19 extend in parallel relation to each other and are parallel to the path of movement of the pipe. The rails 19 are supported on a pair of flat mounting plates 20 which are in turn secured to the ground in a conventional manner. Thus, the carriage 13 is enabled to roll smoothly in either direction along the path of the pipe 10.

A pair of guard rails 21, 22 (FIG. 2) are mounted on the support plates 20 and extend in generally parallel relation to the rails 19. The carriage 13 is moved along the rails 19 by means of a flexible chain 23 which has one end thereof securely connected to the front portion of the base 15 by a suitable attachment 24 and the other end thereof connected to the rear portion of the base 15 in a similar manner (not shown). The chain 23 is operably engaged with a sprocket 25 which is connected to and driven by a variable speed, reversible type motor 26, connected to a conventional source of electric power (not shown).

The motor 26 is actuated and controlled by a plurality of microswitches 27, 28 and 29, respectively, connected together and to the motor 26 by a conventional electrical circuit (not shown). The microswitch 27 is positioned on the run-out table 57 (to be subsequently described) directly in the path of the pipe 10 to be contacted by the forward free end of the pipe 10. The switch 27 is adjustably mounted on the run-out table 57 to thereby determine the length of the pipe to be cut. When the free end of the pipe 10 contacts the microswitch 27, the electric motor 26 is energized to cause the carriage 13 to be moved forwardly in the direction of movement of and at the same rate as the pipe 10.

The carriage 13 will thus move in a forward direction (from left to right as viewed in FIG. 1) until a resiliently mounted dog 30 on the leading portion of the frame 14 contacts the microswitch 28, thus reversing the electrical circuit and hence the motor 26. This results in reversing the direction of movement of the carriage 13 and it is pulled to the rear by the chain 23 until a resiliently mounted dog 31 on the rear portion of the frame 14 contacts the microswitch 29 to thereby simultaneously reverse and break the electrical circuit.

It will be understood that the microswitches 28, 29 are adapted to be operated by the dogs 30 and 31 in one direction only. After the electrical circuit is thus broken, the momentum of the carriage 13 will cause it to coast a short distance beyond the microswitch 29, and the carriage 13 will remain in this initial at rest position until the microswitch 27 is once again contacted by the forward free end of the next succeeding length of pipe 10.

The cutting means utilized with the present invention may be any suitable type of cutting means, as for example any type of saw blade, abrasive wheel, burning tool, or some type of fluid or air pressure system. The cutting means, indicated generally at 32, is mounted on the carriage 13 for movement therewith and is adapted to be moved into and out of cutting relation to the pipe and to remain in such cutting relation a sufficient time to insure a complete and clean cutoff of the pipe. In the preferred embodiment of the present invention the cutting means comprises a circular saw blade 33 which is adapted for metal cutting operations. The saw blade 33 is operably connected to a standard electric motor 34 by means of a conventional chain and sprocket and drive shaft arrangement indicated at 35. The motor 34 is connected to a suitable source of electric power (not shown). A protective covering 36 is positioned over the saw blade 33 in a conventional manner to allow the lower portion of the blade 33 to project below the cover 36.

The cutting means 32 is mounted on a support platform 37 comprised of a plurality of parallel channels 38 which are securely connected together in a conventional manner. The platform 37 is carried by the carriage 13 by means of a pivot support post 39 and a pivot pin 40 extending through the post 39 and the channels 38. The combined weight of the platform 37, the saw blade 33 and the motor 34 tends to normally bias the platform 37 downwardly about the pivot pin 40, or in a counterclockwise direction relative to FIG. 2.

The free end of the platform 37 remote from the pivot pin 40 is in engagement with the upper end of a vertically extending follower arm 41 which is carried by the carriage 13 for slidable movement relative thereto by a pair of brackets 42, 43 mounted on the frame 14. Mounted in the upper end of the follower arm 41 are a pair of threaded bolts 44 which bear directly against the underside of the free end of the platform 37.

The lower end of the follower arm 41 terminates in a cam roller 45 adapted to roll freely on a cam track, to be subsequently described. A spacer bar 46 is securely attached to follower arm 41 (FIG. 3) immediately above roller 45. A swingable follower arm 47 is pivotally connected to the bar 46 and terminates at its lower end in a cam roller 48. As seen in FIG. 1, the follower arm 47 is normally longitudinally aligned with the follower arm 41 and the cam roller 45 and 48 are normally axially aligned. The follower arm 47 is adapted to swing in one direction only, and is prevented from swinging in a forward direction by a flat stop bar 49 (see FIG. 3).

The cam rollers 45 and 48 are adapted to traverse an inner cam track 50 and an outer cam track 51, respectively, which are parallel to each other and extend parallel to the path of movement of the pipe 10. The cam track 50 has a dwell 52 positioned therein (FIGS. 3 and 4) having inclined portions 53 and 54 to allow the cam roller 45 to gradually enter and leave the dwell 52. The flat portion of the dwell 52 is indicated at 55 in FIGS. 3 and 4 and it is the length of this flat portion that determines the amount of time that the saw blade 33 is in cutting relation to the peripheral wall of the pipe 10. The roller 45 may possibly be prevented from traversing the dwell 52 if the cam roller 48 remains coaxial with the cam roller 45. In order to insure that the follower arm 47 is swung rearwardly into the position shown in FIG. 3, a lip 56 is integrally formed in the cam track 51 a short distance before the point where the roller 45 begins to traverse the dwell 52. When the roller 48 hits the lip 56 it will be kicked out of coaxial alignment with the cam roller 45 to allow the cam roller 45 to traverse the dwell 52 and to cause the cam roller 48 to trail on the cam track 51. When the cam roller 45 exits from the dwell 52 the cam roller 48 will become coaxially realigned with roller 45, as previously described. When the direction of movement of the carriage 13 is reversed, as shown in FIG. 4, the cam roller 48 will remain coaxial with the cam roller 45 due to the bar 49, thus preventing the cam roller 45 from traversing the dwell 52 on the return of the carriage 13 to its initial at rest position. Thus it will be apparent that for at least a portion of its movement in one direction the cutting means is supported solely by the cam roller 45, and is supported solely by the cam roller 48 during at least a portion of the return movement of the carriage 13.

It will be understood that the depth of the dwell 52 along the flat portion 55 determines the distance which the saw blade 33 is lowered to be thereby brought into cutting engagement with the peripheral wall of the pipe 10. Since the carriage 13 and hence the cutting means 32 are moving at the same rate of speed as the pipe 10, the rotation of the pipe 10 will feed the remaining portion of the peripheral wall of the pipe 10 to the saw blade 33 to thereby effect a clean and complete cutoff of the pipe. Generally, the length of the flat portion 55 of the dwell 52 is such as to allow the pipe to complete approximately 1⅓ revolutions to insure a complete cut of the pipe.

The run-out table indicated generally at 57 in FIG. 1 is provided to support initially the free end of the pipe 10 and subsequently the cut pipe length. The run-out table 57 is comprised of a plurality of spaced, aligned support stations extending along the path of movement of the pipe 10 and comprised of upright support posts 58 which are grouped in fours (FIG. 1). The support stations are rigidly connected together by a plurality of channels 59 (see FIG. 5) and are spaced such a distance apart to enable the pipe to be supported by at least two of the support stations during the cutting thereof. Each of the support stations supports therefrom a transversely extending cross beam 60 on which is mounted a pair of support rollers 61 which are similar to and aligned with the support rollers 16 carried by the carriage 13. The cross beam 60 is connected to the support posts 58 by means of bolts 62 extending through a vertically extending slot 63 in each of the support posts 58. In this manner the height of the cross beam 60 and hence the rollers 61 may be adjusted by positioning the bolts 62 within the slots 63 as desired and tightening the bolts 62 to secure the cross beam 60 in the selected position. It will be apparent that such adjustments are necessary to accommodate different pipe diameters, and that when making such adjustments the rollers 16 on the carriage 13 and the rollers 61 in the run-out table 57 must always be aligned in order to properly support the pipe 10.

In order to remove the cut pipe length from the run-out table, there is provided an ejecting apparatus shown in detail in FIG. 6 and indicated generally at 64. The ejecting apparatus 64 is mounted on the cross beam 60 in cooperation with the rollers 61 for moving the cut pipe length transversely of the run-out table to thereby allow the cut pipe length to roll down an inclined ramp and onto an adjacent stock pile. While the following description will be limited to one ejecting apparatus, it will be obvious that one such ejecting apparatus may be mounted on each support station on the run-out table.

A linearly movable ejecting cradle 65 is positioned adjacent a pair of supporting rollers 61 on the cross beam 60 and is located beneath the level of the rollers to allow the free end of the pipe length 10 to pass freely over the cradle without interfering with the movement of the pipe. The cradle 65 is securely connected to a guide arm 66 mounted in a guide bracket 67 which is secured to the cross beam 60. It will be noted in FIG. 6 that the guide arm 66 is mounted at an angle so that when the cradle 65 is actuated it will cradle the bottom of the pipe 10 and push it upwardly and transversely of the run-out table. The cradle 65 is adapted to be moved a sufficient distance to roll the pipe length 10 over the left hand roller 61 in FIG. 6 until the center of gravity of the pipe is displaced over the roller to allow the pipe to roll down the ramp.

The cradle 65 is actuated by a toggle lever assembly comprising a lever 68 pivotally connected at one end thereof to the guide arm 66 at a point immediately below the juncture of guide arm 66 and the cradle 65, and is pivotally connected at the other end thereof to a rod 69. The rod 69 is slidably mounted for parallel movement relative to the cross beam 60 by means of a pair of brackets 70 which are secured to the side of the cross beam 60. A lever 71 is operably associated with the rod 69 by means of a bar 72 which is secured to the rod 69 between the brackets 70. The lower end of the bar 72 terminates in a pin 73 which is pivotally mounted in one end of the lever 71. The other end of the lever 71 is pivotally mounted within a bracket 74 by means of a pin 75. Also secured within the bracket 74 is a movable actuating arm 76.

Referring to FIGS. 1 and 6, when the actuating arm 76 is moved from right to left (FIG. 1) or away from the viewer in FIG. 6, the lever 71 is pivoted in a horizontal plane about pin 75 to cause the bar 69 to move from the position shown in full lines in FIG. 6 to the position shown in dot-dash lines, or from right to left. This movement of the bar 69 causes the lever 68 to be pivoted in a clockwise direction thus moving the guide arm 66 upwardly through the bracket 67 and raising the cradle 65 into contact with the lower portion of the pipe length 10. As previously described, this movement of the cradle 65 causes the pipe length 10 to be tipped over the left hand roller 61 (FIG. 6) to assume the position shown in dot-dash lines and indicated at 10a. When the center of gravity of the pipe length 10a is thus displaced, the pipe length 10a will roll down the inclined ramp 77 onto the adjacent stock pile indicated at 77a in FIG. 5.

The actuating mechanism for the ejecting apparatus 64 is shown in detail in FIG. 7. A support channel 78 is secured between adjacent support posts 58 (FIG. 1) in a conventional manner so as to be positioned transversely of the run-out table 57. A guide member 79 is securely attached to the bottom of the channel 78 for slidably supporting the actuating arm 76. Mounted on the distal end of the actuating arm 76 remote from ejecting apparatus 64 is a pivotal latch hook 80. The hook 80 terminates in a hook bill 81 which slopes downwardly to form a rearwardly facing catch member 82. The catch member 82 of the hook 80 is adapted to engage a dog 83 which is mounted on the inside of the upper frame portion 14 by means of bolts 84. A plurality of spaced holes 85 are positioned in the frame member 14 to allow the position of the dog 83 to be adjusted to accommodate different pipe sizes.

The hook 80 has an upright ear 86 securely attached to the rear portion thereof to thereby form an integral right angular member. The hook 80 and ear 86 are pivotally connected to a rigid support bar 87 by means of a pivot pin 88. The support bar 87 is securely connected to the end of the actuating arm 76 by means of bolts 89. A rod 90 is pivotally connected at one end thereof to the upper end of the ear 86 and is supported adjacent its other end for free sliding movement in a suitable opening in the support channel 78. A portion of the rod 90 extends beyond the support channel 78 and terminates in a stop member 91 which is securely attached to the terminal end of the rod 90. A helical compression spring 92 is positioned around the end of the rod 90 adjacent the ear 86. Thus one end of the spring 92 abuts against the ear 86 and the other end thereof abuts against a right angular bracket 93 which is secured at its lower end to the bar 87 and has its upper end adapted to support the rod 90 for sliding movement relative thereto.

Shortly after the pipe length has been cut and precisely when the carriage 13 reaches the end of its forward movement, the dog 83 mounted on the frame 14 will engage the bill 81 of the hook 80 to thereby cause the hook 80 and ear 86 to pivot upwardly about the pivot pin 88 until the catch portion 82 clears the dog 83, at which time the spring 92, which was compressed by the upward movement of the hook 80 and ear 86, will cause the hook 80 and ear 86 to be pivoted downwardly and engage the catch portion 82 with the dog 83. It will be understood that the positioning of the hook 80 and the movement of the carriage 13 are coordinated so that the engagement of the hook 80 with the dog 83 occurs at the extremity of the forward movement of the carriage 13. With the catch portion 82 of the hook 80 firmly engaged with the dog 83, the carriage 13 begins its rearward movement, thus pulling the arm 76 with it in the direction of the arrow in FIG. 7, or to the left as viewed in FIG. 1. This movement of the arm 76 actuates the ejecting apparatus, as previously described.

The arm 76 and hence the rod 90 will continue to be pulled by the carriage 13 until the stop member 91 on the end of the bar 90 engages the channel member 78. This causes the hook 80 and ear 86 to be pivoted upwardly to thereby disengage the catch member 82 from the dog 83. As soon as the catch member 82 clears the dog 83, the hook 80 and ear 86 will be pivoted downwardly by the spring 92. A tension spring 94 (FIG. 1) is connected at one end thereof to a support post 58 and at the other end thereof to the arm 76. When the hook 80 is released from engagement with the dog 83 the spring 94 will return the arm 76 to its original position shown in FIG. 1.

In operation, the carriage 13 is normally in its initial at rest position shown in FIG. 1. The pipe 10 is being continuously formed in the forming apparatus 11 and rotatably emerges from the forming apparatus along a path defined by its longitudinal axis. The forward free end of the pipe comes into engagement with and is supported by the rollers 16 on the carriage 13 and continues its movement until it is supported by the rollers 61 on the run out table 57. When the free end of the pipe 10 contacts the microswitch 27 the motor 26 is energized to move the carriage 13 along the rails 19 at the same rate as the pipe 10. The saw blade 33 is maintained out of cutting relation with the pipe 10 until the cam roller 45 enters the dwell 52 in the cam track 50, at which time the saw blade cuts into the peripheral wall of the pipe 10. The rotation of the pipe 10 feeds the rest of the peripheral wall of the pipe to the saw blade 33 to thereby effect a clean and complete cutoff of the pipe. The saw blade 33 is moved out of cutting relation with the pipe when the cam roller 45 reaches the end of the dwell 52.

It will be observed that during the cutting operation the cutting means is supported solely by the cam roller 45, as the cam roller 48 is swung rearwardly by the lip 56 on the cam track 51. As the carriage 13 continues its forward movement the dog 30 will engage the microswitch 28 to reverse the circuit and start the carriage 13 on its rearward movement. When the carriage 13 reaches the end of its forward movement the dog 83 on the upper frame 14 (FIG. 7) engages the hook 80 to pull the arm 76 along with the carriage 13 as it moves toward the rear, thus actuating the ejecting apparatus 64 (FIG. 6) which results in tipping the cut pipe length 10 over the roller 61 and allowing it to roll down the ramp 77 onto the adjacent stock pile 77a. The hook 80 is disengaged from the dog 83 by means of the stop member 91 contacting the channel member 78, at which time the arm 76 is returned to its initial position shown in FIG. 1 by means of the spring 94.

The carriage 13 continues to move rearwardly until the dog 31 contacts the microswitch 29 to simultaneously break and reverse the circuit and thereby stop the motor 26. The momentum of the carriage 13 will cause it to coast a short distance beyond the microswitch 29 to its initial at-rest position shown in FIG. 1. The carriage 13 will remain in this initial at-rest position until the microswitch 27 is once again contacted by the forward free end of the next succeeding length of pipe.

The automatic combined operation of the cutting apparatus and the ejection apparatus effects a clean and complete cutting of the pipe length and requires practically no manual handling in transfering the cut pipe lengths onto an adjacent stock pile.

A modified form of the pipe cutting and handling apparatus is illustrated in FIGS. 8, 9, and 10. In this form both the carriage of the cutting apparatus and the handling apparatus are reciprocably movable on tracks. Further, the formed pipe is cut into desired lengths from below rather than above the pipe. This expedient facilitates the cutting and handling of pipe of large diameter and is also desirable in operations in which there is a large range in the diameters of the pipes being formed. In FIG. 8 the pipe cutting portion of the apparatus is indicated generally at 96 and includes a carriage 97 supported on wheels 98 which roll on a pair of spaced, parallel rails 99. Rails 99 extend along the path of travel of pipe issuing from the forming apparatus.

Carriage 97 is reciprocated on rails 99 in the same manner as carriage 13 (FIG. 1) by a motor (not shown) through a chain 101 connected to each end of carriage 97. In FIG. 8 the cutting apparatus carriage is shown in its forward position at the end of rails 99 adjacent the pipe handling portion of the apparatus at which position the cutting operation has been completed. In its rear or rest position carriage 97 is at the other end of rails 99 adjacent the pipe forming apparatus 11 (as in FIG. 1).

Mounted at the rear end of carriage 97 is the cutting means or circular saw blade 102 (FIG. 8). Blade 102 is mounted on a shaft 103 rotatably supported in pillow blocks 104 which are mounted on one end of a frame 105 fabricated of I-beam frame members. Supported on the opposite end of frame 105 is a motor 106 which drives blade 102 by means of belt drive 107 (FIG. 10).

Frame members 105 are pivotally supported on a central transverse pin 108 extending into brackets 109 on carriage 97.

An hydraulic cylinder 111, connected between carriage 97 and frame 105 at the saw end functions to raise saw 102 into cutting engagement with a pipe situated thereover. As saw 102 is raised, motor 106 is lowered. The location of pivot 108 may be such that the frame 105 tends to tip saw 102 downwardly so that it will return to a lowered position by the force of gravity. Alternatively, cylinder 111 may be a double acting hydraulic cylinder for positively raising and lowering saw 102, or a spring return can be provided for such cylinder.

The pipe handling portion of the apparatus of the modified form of this invention comprises one or more runout tables or pipe length support stations 112 supported for movement along a pair of spaced, parallel rails 114 (FIGS. 8, 9) aligned with rails 99.

Each runout table comprises a base frame 115 having wheels 113 running on tracks 114, and longitudinally extending side bars 134 connecting said base frames for movement of tables 112 together. The upper end of each base frame is formed with a pair of spaced ears 116 (FIG. 9) in which a longitudinally extending pivot rod 117 is journalled. A cradle, generally designated 120, is swingably supported on each base frame by means of a pair of arms 118 connected to pivot rod 117.

Each cradle 120 includes a pair of transversely extending end members 121, 122, each made from a pair of channels 123 rigidly connected in the form of a wide V (FIG. 9), with arms 118 depending from their apices. The outer ends of members 121, 122 are rigidly connected by longitudinally extending side members 124.

The inwardly opening channels 123 form tracks in each of which the wheels 125 of roller support frames 126 are guided. There are a pair of frames thus carried by each cradle 120 for movement toward and away from each other along channels 123. Each support frame 126 carries a roller 127 which extends longitudinally of runout table 112. Screw threaded rods 130, each rotatably secured to a side member 124 and threadedly received in a nut 128 secured to each frame 126, are provided as means for moving rollers 127 from inner positions, illustrated in FIG. 9, to outer positions spaced farther apart at the outer ends of channel members 123.

A pipe support structure 110 (FIG. 8), similar to cradles 120, may be similarly mounted on saw carriage 97 for supporting the pipe issuing from the pipe forming machine adjacent saw 102. In their normal pipe receiving and supporting position, the pair of rollers 127 of each cradle 120 and of pipe support 110 are spaced apart in the same horizontal plane on opposite sides of and extending parallel to the path of the pipe issuing from the pipe forming apparatus. The issuing pipe is thereby received on rollers 127 with its center of gravity or longitudinal axis 119 (FIG. 9) bisecting the space between such rollers and is supported at a plurality of pairs of spaced points on its lower periphery along its issuing path, depending upon the number of runout tables or stations 112.

When a desired length of pipe is thus received on cradles 120 and support 110 and has been severed from the continuous pipe being formed, it may be ejected from the runout tables 112 in order that they will be clear to receive a succeeding length of pipe. In the modified form of the invention disclosed in FIGS. 8, 9 the pipe length may be ejected to either side of the path of travel of the continuous pipe issuing along the runout tables.

Means for ejecting the cut pipe length from each of the runout tables is provided by a pair of end-to-end hydraulic or pneumatic double-acting cylinders 130, 131 (FIG. 9) which are pivotally connected at one end to a downwardly depending portion of arm 118 and at the other end to frame 115. As illustrated in FIG. 9, when cylinder 130 is fully retracted and cylinder 131 is fully extended cradle 120 is in a generally horizontal pipe receiving and supporting position. Fully retracting cylinder 131 causes cradle 120 to be tilted to the dot-dash line position 132 in which the longitudinal axis 119 of pipe length 133 is shifted outwardly of the point of contact of one of the rollers 127 and the pipe length. This transverse shifting of the pipe length 133 permits it to roll over the said one roller 127 and downwardly along the lowered side of cradle 120 to a storage area as in the case of the form of the invention of FIGS. 5, 6. When both cylinders 130, 131 are fully extended the cradle 120 tilts in a direction opposite to position 132 and the pipe 133 would be ejected to the other side of tables 112.

It will be understood that the horizontal spacing between rollers 127 (FIG. 9) is adjusted depending upon the diameter of the pipe 133 and the throw of arm 118 by cylinders 130, 131 so that tilting of cradle 120 is effective to dump the pipe length out of its path of travel as received from the forming machine. Cylinders 130, 131 of each runout table 112 are hydraulically interconnected so that they operate under a common control for dumping all said tables together. As previously explained, any number of runout tables 112 may be connected by bars 134 for rolling along rails 114 together.

A pneumatic or hydraulic double-acting cylinder 135 (FIG. 8) is provided for holding tables 112 in a normal rest position and for moving them back and forth along rails 114 during a portion of the handling cycle. Cylinder 135 can be located in any desirable position and is connected between the floor or stationary support and any one of the tables 112. Cylinder 135 operates to move tables 112, carrying a cut length of pipe, away from saw carriage 97 at a rate faster than the rate of feed of the pipe issuing from the pipe forming machine. Thus the newly cut trailing end of the severed pipe length is spaced from the leading end of the succeeding pipe issuing from the forming machine to prevent interference between such ends when the severed pipe length is ejected.

In operation at the beginning of a cycle, the pipe leaves the forming machine travelling in a path extending along its longitudinal axis and is received on support 110 of the pipe cutoff apparatus 96. At this time the cutoff apparatus is at the end of rails 99 adjacent the forming machine (opposite to that shown in FIG. 8) and the runout tables 112 are in their normal, rest position (substantially as shown in FIG. 8).

When the pipe has ben fed out to the desired length onto tables 112, its leading end trips a microswitch (mounted along the path, such as switch 27, FIG. 1) which initiates movement of carriage 97 at the same speed and in the same direction as the formed pipe is being fed. Thereafter, cylinder 111 is activated as by a control circuit including a microswitch, and extended to raise saw blade 102 into cutting engagement with the pipe. Complete severance of the pipe is caused by rotation of the pipe into blade 102 as in the case of the first form of the invention. When the cut is completed either a time delay mechanism or a microswitch reverses the action of cylinder 111 and retracts the same lowering blade 102 out of engagement with the pipe. The function of cylinder 111 and its control circuit is generally the equivalent of the cam support mechanism of the form of FIG. 1.

As blade 102 is lowered and clears the pipe, carriage 97 is approaching the forward position of FIG. 8 where it trips a microswitch (such as switch 28 in FIG. 1) which reverses the movement of said carriage and returns it to its rest position.

Such a microswitch may also be employed to activate cylinder 135 to move runout tables 112 to the left as seen in FIG. 8. It should be noted that the formed pipe is still being fed at the same rate of speed from the forming machine even though carriage 97 is moving opposite to the movement of said pipe. When cylinder 135 is extended tables 112 carry the cut pipe length away from the forming machine so that a gap is created between the trailing end of the severed pipe length and the leading end of the succeeding pipe issuing from the forming machine. As cylinder 135 nears the end of its stroke either a time delay mechanism or a microswitch may be employed to activate either cylinder 130 or cylinder 131, depending on which side of tables 112 the severed pipe length is to be ejected. Upon ejection of the pipe length from its path of travel cylinder 135 is retracted to return tables 112 to the position of FIG. 8. At the same time the action of either cylinder 130 or 131 is reversed to return cradle 120 to the horizontal pipe receiving position of FIG. 9 ready to receive the succeeding pipe and repeat the cutting and handling cycle.

It should be noted that in place of the double-acting cylinders used herein, spring returns can be provided in each case with the same results. The control mechanisms employed in connection with the hydraulic or pneumatic cylinders of the modified form of FIGS. 8–10 will be understood as being conventional in construction and the arrangement thereof is substantially the same as in the embodiment of FIGS. 1–7.

Although this invention has been described in detail, such as not to be taken as restrictive thereof as modifications that would appear to those skilled in the art will be understood to be within the spirit and scope of the invention.

I claim:

1. Cutting apparatus for use in connection with an elongated sheet metal pipe moving at a predetermined rate in one direction along a path of travel extending longitudinally of said pipe, comprising:
   (a) a carriage supported for movement parallel to said path;
   (b) driving means connected to said carriage for so moving the same at said predetermined rate in said one direction;
   (c) cutting means carried by said carriage and supported for transverse movement into and out of cutting relation to said pipe in said path; and
   (d) means responsive to said movement of said carriage past a first point for so moving said cutting means into said cutting relation for cutting said pipe and past a second point spaced from said first point a fixed distance in said one direction for so moving said cutting means out of said cutting relation.

2. Cutting apparatus for use in connection with an elongated sheet metal pipe moving at a predetermined rate in one direction along a path of travel extending longitudinally of said pipe and rotating about its longitudinal axis, comprising:
   (a) a carriage supported for movement parallel to said path;
   (b) driving means connected to said carriage for so moving the same at said predetermined rate in said one direction;
   (c) cutting means carried by said carriage and supported for transverse movement into and out of cutting relation to the peripheral wall of said pipe in said path; and
   (d) means responsive to said movement of said carriage past a first point for so moving said cutting means into said cutting relation for at least one complete rotation of said pipe for cutting said pipe and past a second point spaced from said first point a fixed distance for so moving said cutting means out of said cutting relation.

3. Apparatus for handling continuous sheet metal pipe being discharged outwardly from a forming machine at a predetermined rate in one direction along a path of travel extending longitudinally of said pipe and rotating about its longitudinal axis, comprising:

(a) a carriage supported for movement parallel to said path;
(b) electric motor means connected to said carriage for driving the same in said one direction, said motor means being variable for synchronizing said carriage with said pipe at said rate;
(c) cutting means carried by said carriage and supported adjacent said path for transverse movement into and out of cutting relation to the peripheral wall of said pipe in said path;
(d) means responsive to said movement of said carriage in said one direction for so moving said cutting means and maintaining said cutting relation for a fixed distance along said path sufficient for said pipe to complete at least one complete rotation; and
(e) control means for starting said motor means at an initial position for driving said carriage in said one direction when a predetermined length of pipe extends outwardly past said cutting means.

4. The apparatus of claim 3, including:
(f) a plurality of spaced support means adjacent and rotatable about axes parallel to said path and engageable by said pipe for supporting the same during cutting.

5. The apparatus of claim 4, including:
(g) ejecting means movable transversely of said path and engageable with said length of pipe for moving the same out of said path.

6. The apparatus of claim 5 wherein:
(h) said ejecting means is responsive to return of said carriage means toward said initial position.

7. Cutting apparatus for cutting into lengths continuous sheet metal pipe being discharged from a forming machine at a predetermined rate in one direction along a generally horizontal path extending longitudinally of said pipe and rotating about its longitudinal axis, comprising:
(a) a carriage normally in rest position and supported for shuttling movement along said path;
(b) first support means rotatable about axes parallel to said path and carried by said carriage for supporting said rotating pipe;
(c) drive means connected to said carriage for moving said carriage in said shuttling movement along said path;
(d) actuating means engageable by the forward free end of said pipe for actuating said drive means to move said carriage from said rest position in said one direction, and including means for reversing the direction of movement of said carriage;
(e) second support means rotatable about axes parallel to said path and remote from and aligned with said first support means for supporting said rotating pipe;
(f) cutting means on said carriage supported in normally out of cutting relation to said pipe; and
(g) means for moving said cutting means into cutting relation with the peripheral wall of said pipe responsive to the movement of said carriage in said one direction and maintaining said cutting relation a fixed distance in said one direction for at least one complete revolution of said pipe for cutting said pipe.

8. Apparatus for handling sheet metal pipe continuously discharged from a forming machine along a generally horizontal path of travel extending longitudinally of said pipe, comprising:
(a) cutting means supported adjacent said path and intermittently operable for cutting said pipe in said path into successive lengths;
(b) support means adjacent said path for receiving and supporting said lengths as the same are cut; and
(c) ejecting means movable transversely of said path and successively operable on each said length as it is cut for moving the same out of said path;
(d) actuating means responsive to operation of said cutting means for initiating said movement of said ejecting means.

9. Apparatus for handling sheet metal pipe continuously discharged from a forming machine along a generally horizontal path of travel extending longitudinally of said pipe, comprising:
(a) cutting means supported adjacent said path and intermittently operable for cutting said pipe in said path into successive lengths;
(b) support means adjacent said path for receiving and supporting said lengths as the same are cut; and
(c) ejecting means movable transversely of said path and successively operable on each said length as it is cut for moving the same out of said path;
(d) said cutting means is movable along said path from an initial position to a forward position at which said cutting is completed and back to said initial position; and
(e) said ejecting means includes means engageable with said cutting means at said forward position for operating said ejecting means in response to movement of said cutting means back toward said initial position.

10. Apparatus for handling sheet metal pipe continuously discharged from a forming machine along a generally horizontal path of travel extending longitudinally of said pipe, comprising:
(a) cutting means supported adjacent said path and intermittently operable for cutting said pipe in said path into successive lengths;
(b) support means adjacent said path for receiving and supporting said lengths as the same are cut; and
(c) ejecting means movable transversely of said path and successively operable on each said length as it is cut for moving the same out of said path;
(d) said support means engages each of said lengths at a pair of horizontally spaced points on the lower periphery thereof on opposite sides of the center of gravity of said length; and
(e) said ejecting means being operable to transversely shift said length so that its center of gravity is horizontally spaced outwardly of one of said points.

11. Apparatus for handling sheet metal pipe continuously discharged from a forming machine along a generally horizontal path of travel extending longitudinally of said pipe, comprising:
(a) cutting means supported adjacent said path and intermittently operable for cutting said pipe in said path into successive lengths;
(b) support means adjacent said path for receiving and supporting said lengths as the same are cut; and
(c) ejecting means movable transversely of said path and successively operable on each said length as it is cut for moving the same out of said path;
(d) said support means being mounted for movement longitudinally of said path; and
(e) means connected to said support means for longitudinally displacing the same with a said length thereon away from said cutting means prior to operation of said ejecting means.

12. Cutting apparatus for cutting into lengths continuously formed sheet metal pipe which is discharged from the forming machine at a predetermined rate in one direction along a path extending longitudinally of said pipe and rotating about its longitudinal axis, comprising:
(a) a carriage supported for movement parallel to said path;
(b) driving means connected to said carriage for so moving the same at said predetermined rate in said one direction, and including means for reversing the direction of movement of said carriage;
(c) first support means carried by said carriage for supporting said pipe;

(d) second support means aligned with said first support means for supporting the cut pipe length;
(e) cutting means carried by said carriage and supported for transverse movement into and out of cutting relation to the peripheral wall of said pipe along said path;
(f) cam track means positioned adjacent said carriage and extending parallel to said path;
(g) cam follower means carried by said carriage in communication with said cutting means and adapted to traverse said cam track means responsive to said movement of said carriage;
(h) said cam follower means and said cam track means cooperating to move said cutting means into cutting relation to said pipe when said carriage moves in said one direction, and to hold said cutting means out of said cutting relation when said carriage moves in the reverse direction.

References Cited by the Examiner
UNITED STATES PATENTS

| | | | |
|---|---|---|---|
| 1,322,843 | 11/19 | Townsend | 82—47 |
| 1,740,430 | 12/29 | Mudd | 82—53.1 |
| 1,843,104 | 2/32 | Blashill | 83—110 |
| 1,936,485 | 11/33 | Schreck | 83—158 |
| 1,986,587 | 1/35 | Ludington | 82—47 |
| 2,196,639 | 4/40 | McLaughlin | 83—37 |
| 2,326,978 | 8/43 | Sieg | 83—48 |
| 2,350,975 | 6/44 | Rodder et al. | 85—53.1 |
| 2,621,106 | 12/52 | Abbey | 29—33.15 |
| 2,711,006 | 6/55 | Abbey | 83—112 |
| 2,866,257 | 12/58 | Stikeleather | 82—53.1 |
| 2,905,111 | 9/59 | Smith | 83—159 |

ANDREW R. JUHASZ, *Primary Examiner.*

LEON PEAR, WILLIAM W. DYER, JR., *Examiners.*

Disclaimer 3,198,043.—*Paul K. Davis*, Alameda, Calif. PIPE CUTTING AND HANDLING APPARATUS. Patent dated Aug. 3, 1965. Disclaimer filed Apr. 12, 1976, by the assignee, *Pacific Roller Die Co., Inc.*

Hereby enters this disclaimer to claims 1, 2, 3, 4, 5, 6, 7, 8, 9 and 10 of said patent.

[*Official Gazette June 8, 1976.*]

Disclaimer

3,198,043.—*Paul K. Davis*, Alameda, Calif. PIPE CUTTING AND HANDLING APPARATUS. Patent dated Aug. 3, 1965. Disclaimer filed Aug. 22, 1977, by the assignee, *Pacific Roller Die Co., Inc.*

Hereby enters this disclaimer to claim 12 of said patent.

[*Official Gazette November 15, 1977.*]